Figure 1:
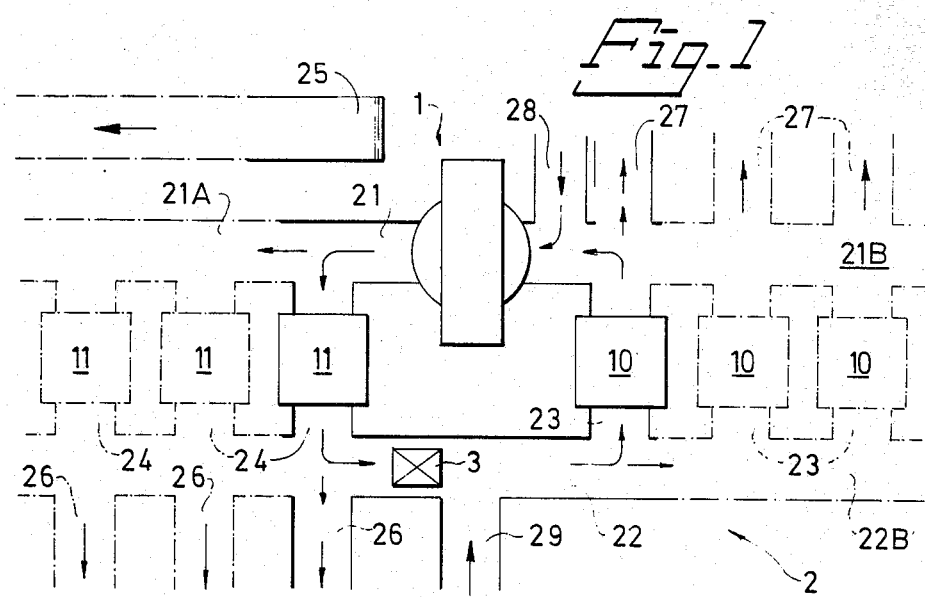

United States Patent [19]

Pettersson

[11] Patent Number: 4,514,158

[45] Date of Patent: Apr. 30, 1985

[54] PLANT FOR COLD ISOSTATIC PRESSING

[75] Inventor: Ola Pettersson, Höganäs, Sweden

[73] Assignee: KB Cold Isostatic Press Systems CIPS, Hoganas, Sweden

[21] Appl. No.: 591,593

[22] Filed: Mar. 20, 1984

[30] Foreign Application Priority Data

Apr. 19, 1983 [SE] Sweden .............................. 8302200

[51] Int. Cl.³ ............................................. B29C 3/00
[52] U.S. Cl. ................................. 425/78; 425/405 H; 425/88
[58] Field of Search ...................... 425/78, 405 H, 411, 425/436 RM, DIG. 200, DIG. 201, 88

[56] References Cited

U.S. PATENT DOCUMENTS

| | | | |
|---|---|---|---|
| 3,550,199 | 12/1970 | Landa | 425/405 H |
| 3,677,674 | 7/1972 | Bowles | 425/78 |
| 3,698,843 | 10/1972 | Bowles et al. | 425/405 H |
| 3,713,193 | 1/1973 | Chiba et al. | 425/78 |
| 3,865,533 | 2/1975 | Deprez et al. | 425/405 H |
| 4,063,941 | 12/1977 | Papen | 425/405 H |
| 4,140,449 | 2/1979 | Takeshi et al. | 425/78 |

FOREIGN PATENT DOCUMENTS 2549048 5/1976 Fed. Rep. of Germany ... 425/405 H
424657 10/1974 U.S.S.R. .......................... 425/405 H Primary Examiner—J. Howard Flint, Jr.
Attorney, Agent, or Firm—Burns, Doane, Swecker & Mathis

[57] ABSTRACT

A plant for cold isostatic pressing of powder to pressed bodies includes a dry isostatic press, a plurality of press tools, a circulation conveyor path (2) for the tools and means for advancing the tools (3) along the path (2). The path (2) includes a first and a second straight section (21,22). On one side of the press there extend a plurality of third straight mutually parallel conveyor sections (23) at right angles to the sections (21,22). Each such third conveyor section (23) extends through an associated filling station (10). A plurality of fourth conveyor sections (24) extend parallel and at right angles to the first and the second conveyor sections (21,22) on the other side of the press. Each fourth conveyor section (24) extends through an associated emptying station (11). Discharge conveyors (26 and 27) connect to the path (2) opposite each third and fourth conveyor section (23,24), respectively, and a corresponding delivery conveyor (29,28) is arranged to allow delivery of replacement tools to the circulation conveyor path (2).

6 Claims, 3 Drawing Figures

PLANT FOR COLD ISOSTATIC PRESSING

TECHNICAL FIELD

The invention relates to a plant for cold isostatic pressing of powder to pressed bodies, including an isostatic press, a plurality of press tools, circulation conveying means for the tools and means for advancing the tools along the conveying means, the tools being arranged along the conveying means for passing a tool filling station, the press and a tool emptying station.

BACKGROUND

Isostatic presses are dimensioned with regard to a very high required working pressure and the size of the pressed bodies, and are therefore very expensive to produce, even for moderate pressed body sizes. It is therefore important to form the press for the greatest possible capacity and to utilize press capacity to a maximum. It is known, e.g. from the U.S. Pat. Nos. 3,667,674 and 3,698,843 to utilize a rotating turntable with at least three press tool positions, which are uniformly distributed along the circumference of the table, and at least three fixed stations, namely a pressing station, an emptying station and a filling/vibration station, under which the tools pass during the turning movement of the table. Such press plant can be controlled relatively simply by indexing the table, but the degree of utilization of the press is determined by the longest operation time in any of the working stations. Even though it will be possible to ensure for some pressed body type that the pressing station constitutes the bottleneck for the material flow in the plant, it will be appreciated that malfunction in any of the remaining stations negatively affects the degree of utilization of the press. For example, if a tool jams in the emptying of filling station the plant must be taken out of operation. If a tool starts to malfunction, e.g. due to tool damage occurring in the press, operations in the plant must be broken off to allow exchange of the damaged tool. In principle, the same drawback occurs if the tool is filled to a too large or too little extent in the filling station or the tool is insufficiently cleaned in the emptying station. It will be similarly appreciated that other pressed body configuration, powder quality or the like may easily cause other stations than that for pressing becoming bottlenecks. One object of the invention is therefore to provide a plant in which at least some of the mentioned drawbacks have been reduced or circumvented.

CHARACTERIZATION OF THE INVENTION

The invention is based on a plant of the type mentioned above and is thereby substantially distinguished by the conveyor means being formed by a first and a second straight section, which are parallel and separate, the first section extending through the press, one or more third, straight, mutually parallel conveyor section each extending through a filling station and connecting at a right angle between the second conveyor section and the first conveyor section at the portion thereof situated on one side of the press, and one or more fourth conveyor sections each extending through an emptying station and joining at a right angle between the second conveyor section and the first conveyor section at the portion thereof situated on the other side of the press. With the aid of the invention there is now provided a circulation conveying means path of right-angular configuration, and having one or more parallel conveyor sections, (on one side) each of which includes an emptying station and a further one or more parallel conveyor sections (on the other side) each including a filling station. Plant operation can now still be maintained, if a filling or emptying station were to be blocked due to tool faults or faults in the emptying or filling apparatus. Furthermore, it is ensured by the inventive plant that the press itself constitutes the plant bottleneck. By the different filling and emptying stations being formed from parallel sections of the right-angular conveying means path, the path can easily be built out to incorporate an optional number of parallel such emptying and filling stations, thus ensuring that the press for all conditions such as powder quality, complex tool shapes, inserts in the tool cavities, numerous checks in the respective stations etc., is utilized to a maximum. The tools can be advanced in a simple way along the different conveyor sections with the aid of conventional urging means, e.g. in the form of push cylinders or the like. Furthermore, by the implementation of the conveyor means in the inventive plant, discharge conveyors may be arranged to meet said third and fourth conveyor sections for allowing right-angular discharge of tools which have been found defective due to damage, insufficient cleaning, insufficient powder filling etc. Such discharged tools can easily be replaced via an input conveyor connecting up to the main conveyor.

Each tool filling station may include powder filling vibration, and insert placing apparatus. Furthermore, an inspection means may be arranged for checking the tool with respect to correct filling. Each emptying station may include a press body ejector, insert removal and cleaning apparatus, inspection apparatus also being possible to arrange for checking the tool with respect to cleaning, possible damage and the like.

The tool filling and emptying stations can be implemented such that they include a plurality of sub-stations arranged in series for the above-mentioned operations. Thus, the number of tools kept in circulation along the conveyor means can be adjusted to allow simultaneous use of the mentioned sub-stations.

The invention will now be described in the form of an embodiment and with reference to the accompanying drawing.

DRAWING

Figure 2:
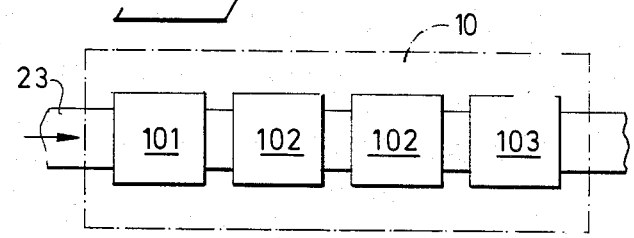
Figure 3:
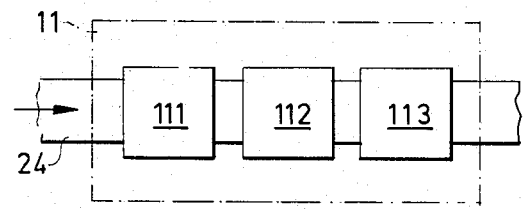

FIG. 1 is a schematic horizontal view of a plant in accordance with the invention. FIG. 2 schematically illustrates a tool filling station in the plant, and FIG. 3 schematically illustrates a tool emptying station in the plant in accordance with the invention.

EMBODIMENTS

A circulating conveyor 2 is illustrated on FIG. 1 for a plurality of press tools 3 (of which only one is illustrated). During a circulation tour along the circulation conveyor 2 each tool passes an isostatic press 1, an emptying station 11 and a filling station 10. The conveyor means 2 includes two generally parallel, separate, straight conveyor sections 21 and 22. The press 1 is situated between the end portions 21A and 21B of the conveyor section 21. One, or a plurality of generally mutually parallel and straight conveyor sections 23 extends at right angles to, and connects the portion 21B of the conveyor section 21 to the end portion 22B of the conveyor section 22. Each of the conveyor sections 23 extends through a filling station 10, and as schematically illustrated in FIG. 2 the filling station may include a station 101 for inserting cores or inserts into the tool, two stations 102 for filling the tool with powder, and a station 103 for vibrating the tool so that its mould cavity is well filled, and for checking the filled tool. One or more mutually parallel conveyor sections 24 extend at right angles to, and connects the portion 21A of the conveyor section 21 to the portion 22A of the conveyor section 22. Each of the conveyor sections 24 extends through an emptying station 11, and, as schematically illustrated in FIG. 3, the station can include a substation 111 for taking out inserts or cores from the tool, a substation 112 for ejecting pressed bodies from the tool and a substation 113 for cleaning and inspecting the tool. A conveyor 25 extends parallel to the portion 21A of the conveyor section 21 for receiving pressed bodies which have been taken from the tool in the stations 11, and for conveying these away for further processing. Conventional means may be utilized for ejecting the pressed bodies and transferring these to the conveyor 25.

A discharge conveyor 26 for defective tools joins onto the portion 22A of the conveyor section 22 opposite the connection for each conveyor section 24 to the conveyor section 22. Between the portions 22A and B of the conveyor section 22 there is a conveyor 29 connecting up to the conveyor section 22 for supplying tools as replacements for those discharged via the conveyors 26.

In a corresponding manner there are one or more discharge conveyors 27 for incorrectly filled or otherwise defective tools, these conveyors 27 connecting up to the portion 21B of the conveyor section 21 opposite the connection of each section 23 to the conveyor section 21. Between the portion 21B of the conveyor section 21 and the press 1 there is an input conveyor 28 for correctly filled tools replacing tools discharged via the conveyors 27.

The press 1 can be of the kind apparent from our Swedish Patent Application and copending U.S. patent application Ser. No. 591,340, filed Mar. 20, 1984 having the title ISOSTATIC PRESS.

The sub-stations 101-103 and 111-113 may contain conventional means for the purposes given, the apparatus of the sub-stations 112 being implemented such as to place the pressed bodies on the conveyor 25. The tools 3 may include a base with outwardly projecting flanges, whereon the conveyor 2 includes undercut portions for such flanges. Apparatus for advancing the tools along the conveyor means 2 and conveyors 26-29 may be conventional. The advancing means can be controlled by the sub-stations 103 and 113 for discharging inoperative or malfunctioning tools from the conveyor 2, and corresponding input of replacement tools to the conveyor 2. To advantage, the advancing means may be of the push type, and thus include reciprocating driving means in the form of working cylinders, for example.

It will be further understood that guiding the tools 3 along the path of the conveyor 2 (conveyor sections 21-24) may be regulated with the aid of suitably programmed microcomputers taking into account the discharge of inoperative tools and the corresponding input of replacement tools in the circulation conveyor 2 via the conveyors 28, 29. It will be also noted that the plant in accordance with the invention allows simultaneous manufacture of different pressed bodies, the tools for the respective type of pressed body being directed to the associated stations 10, 11, these tools having a standardized exterior for coaction with the press 1 independent of the configuration of the pressed body which is to be manufactured.

The inventive plant permits maximum utilization of the press, irrespective of malfunction, incorrect filling degree, insufficient cleaning etc. of the tools, and independent of the handling time for the individual tools in the stations 10, 11.

By the inventive implementation of the plant circulation conveyor means, the number of stations 10, 11 may be easily increased for ensuring that the press works at a maximum rate, even though complex pressed bodies are to be manufactured, these requiring long handling time in some of the stations 10, 11 before and/or after the press.

Of course, a plurality of tools may be utilized in the circulation path of the plant, this number being larger than, or equal to, the number of sub-stations for allowing optimalizing utilization of the substations and thus allowing maximum output of ready-treated tools from the respective station 10, 11, enabling the substations 101-103 and 111-113 to be regarded as functioning analogous to a so-called shift register.

By sections 21-24 of the conveyor means 2 being made straight and mutually at right angles, the advance of the tools along the conveyor will be comparatively simple. The conveyor extends preferably in a horizontal plane, but is should be clear that at least certain parts of the conveyor can comprise simple straight roller conveyors along which the tools move by gravity. Furthermore, it should be clear that suitable stops can be arranged for providing exact location of the tools in the respective station.

By allowing the tools to have a square or rectangular base, the side length of which substantially agrees with the width of the conveyor paths, it is ensured that the tools have predetermined turning positions in all stations, which has particular advantages when the moulding cavity of the tool is not axially symmetric, or inserts are to be inserted by machine in specific positions in the tool. Furthermore, transfer of tools from one conveyor section to the next is simplified.

I claim:

1. A device for cold isostatic pressing of powder to pressed bodies, including an isostatic press, a plurality of press tools, a circulation conveyor path for the tools, and means for advancing the tools along the path, the tools being arranged along the path to pass a tool filling station, the path including; a first and second straight conveyor section positioned parallel and separate to each other, the first conveyor section extending through the press, a plurality of third, straight, mutually parallel sections, each of said third parallel sections extending through an associated filling station and connecting at a right angle between the second conveyor section and the first conveyor section at a portion of the conveyor path situated to one side of the press, a plurality of fourth conveyor sections, each of said fourth conveyor sections extending through an associated emptying station and connecting at a right angle between the second conveyor section and the first conveyor section at a second portion of the conveyor path situated on an opposite side of the press, a first service conveyor connected to the second conveyor section for permitting discharge of inoperative tools from the circulation conveyor path, a second service conveyor connected to the circulation conveyor path for supplying said tools to said circulation conveyor path so as to replace tools removed by said first service conveyor, a third service conveyor connected to the first conveyor section so as to permit the removal of inoperative tools from the circulation conveyor path subsequent to passing said filling station and prior to delivery to the press, and wherein the tools are provided with a substantially rectangular base, a side of said base being substantially as long as the conveyor path width.

2. A device as claimed in claim 1, comprising a fourth service conveyor connected to the first conveyor section in front of the press, for allowing delivery of an operative and correctly filled tool to the portion connecting to the press of the first conveyor section as replacement for a tool removed via the third service conveyor.

3. A device as claimed in claim 1, wherein each tool filling station is arranged to provide tool filling in one or more operations for which there are corresponding substations, including a substation for putting in inserts, at least one powder filling substation, and a vibration substation and possibly a tool inspection substation.

4. A device as claimed in claim 1, wherein each tool emptying station is arranged to provide tool emptying in one or more operations for which there are corresponding substations including a substation for ejecting the pressed body, a substation for ejecting inserts, and a substation for cleaning the tool.

5. A device as claimed in claim 3, further including a tool inspection substation.

6. A device as claimed in claim 4, further including a tool inspection substation.

* * * * *